United States Patent Office 3,313,786
Patented Apr. 11, 1967

3,313,786
POLYMERS OF 1-MONOOLEFINS
AND FULVENES
Gerald R. Kahle and Ollie G. Buck, Bartlesville, Okla., assignors to Phillips Petroleum Company, a corporation of Delaware
No Drawing. Filed Mar. 12, 1964, Ser. No. 351,525
6 Claims. (Cl. 260—79.5)

This invention relates to a process for copolymerizing 1-monoolefins with a monomer which imparts unsaturation to the resulting polymer, and to the polymers so produced. In another aspect, this invention relates to a process for copolymerizing ethylene, at least one other higher 1-monoolefin such as propylene, and a monomer which imparts unsaturation to the resulting polymer and renders the same sulfur-vulcanizable. In another aspect, this invention relates to novel copolymers of 1-monoolefins and monomers which impart unsaturation to the copolymers.

Recently, there has been considerable interest in ethylene-propylene copolymers and copolymers of ethylene and other higher 1-olefins, particularly elastomers. A serious limitation which has prevented widespread application of rubbers produced by these polymerization processes is the lack of unsaturation along the product polymer chain. Therefore, these product polymers are not vulcanizable with conventional agents such as sulfur and sulfur compounds as in the case of, for example, butadiene/styrene polymers. Vulcanization of these polymers, such as in ethylene/propylene copolymer, conventionally requires the use of expensive high energy radiation or organic peroxides, or requires pretreatment such as chlorosulfonation or chlorination of the polymer in order to render it suitable for curing. Such process limitations detract from the gains to be had by the unique properties possessed by the polymers, especially ethylene/propylene copolymers which are higher molecular weight rubber-like substances having a high degree of resistance to weathering, sunlight and ozone.

Accordingly, an object of our invention is to provide an improved process for the copolymerization of 1-monoolefins.

Another object of our invention is to provide improved polymers of 1-monoolefins, which polymers can be cured with sulfur.

Another object of our invention is to provide an improved process for chemically modifying an ethylene and 1-monoolefin copolymer so as to impart some degree of unsaturation thereto and make it amenable to vulcanization with sulfur.

Further objects, advantages and features of our invention will become readily apparent to those skilled in the art from the following description and appended claims.

Briefly, the improved process of our invention comprises copolymerizing ethylene and at least one other higher 1-monoolefin with a fulvene, and recovering the resulting novel polymer from the polymerization reaction mixture. It has been discovered that if fulvene or a selected hydrocarbon derivative thereof is present in a system for the copolymerization of ethylene with a higher 1-monoolefin, the unsaturated compound is incorporated into the polymer molecule. The product resulting from this reaction is a terpolymer. The terpolymer contains a significant amount of unsaturation and is, therefore, readily vulcanizable.

The fulvenes employed as novel comonomers with the 1-monoolefins, according to this invention can be represented by the general formula

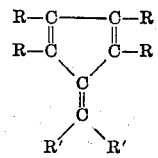

where R and R' represent hydrogen or hydrocarbon radicals selected from the group consisting of alkyl, alkenyl, cycloalkyl, aryl and aralkyl radicals containing from 1 to 8 carbon atoms, and the two R' groups together can form a bivalent hydrocarbon radical. When the hydrocarbon radical is unsaturated, the double bonds are positioned so as to form a non-conjugated system with the double bonds in fulvene. It is preferred that two of the R groups be hydrogen and that these hydrogen atoms be on adjacent carbon atoms, preferably those joined by an ethylenic bond. Representative fulvenes and hydrocarbon derivatives thereof which can be employed as comonomers in the copolymerization of 1-monoolefins include: fulvene, 6,6-dimethylfulvene, 6,6-diethylfulvene, 6,6-di-n-butylfulvene, 6-tert-butylfulvene, 6-(2-butenyl)fulvene, 6,6-di(3-butenyl)fulvene, 6,6-dicyclobutylfulvene, 6,6 - tetramethylenefulvene, 6,6-di(2-butenylene)fulvene, 6-methyl-6-ethylfulvene, 1,2,6,6 - tetramethylfulvene, 1,2, 6,6-tetraethylfulvene, 1,2-di-n-butylfulvene, 1,2-dimethyl-6,6 - diisopropylfulvene, 1,6-dimethyl-2-cyclobutylfulvene, 1,6,6-trimethyl-2(2-propenyl)fulvene, 6-phenylfulvene, 6-methyl-6-phenylfulvene and 6,6-dibenzylfulvene, and the like, including mixtures thereof. Fulvenes as the term is hereinafter applied includes the hydrocarbon derivatives of said fulvenes.

The fulvenes are effective for introducing unsaturation into copolymers of ethylene with higher 1-monoolefins and are of particular interest in the production of vulcanizable elastomers. While the invention is not limited to any reaction mechanism, it is believed that each molecule of the fulvene that becomes a part of the polymer molecule furnishes at least two ethylenic bonds.

The amount of the fulvene compound charged to the polymerization system can vary over a wide range. The quantity of fulvene compound charged to provide from 0.1 to 20 percent unsaturation, expressed in terms of ICl employed to determine unsaturation, will range from 0.04 to 7.1 mmols ICl per gram of polymer. Calculated as dimethylfulvene, this amount of unsaturation represents about 0.2 to 38 weight percent of the termonomer in the product.

Relative percentages of the polymers of this invention attributable to each of the monomers employed can vary widely, with a minimum amount of the fulvene comonomer being that sufficient to impart sulfur-curability to the polymer. Generally, the fulvene compound will make up 15 weight percent or less of the copolymer. Ethylene will comprise at least 20 weight percent of the copolymer and at least 20 weight percent of the copolymer will be comprised of a higher 1-monoolefin containing from 3 to 8 carbon atoms per molecule. A polymer product in which 15 weight percent of dimethylfulvene is present, for example, has about 8 percent unsaturation.

The 1-monoolefins which are copolymerized with ethylene and any of the above-mentioned fulvenes can be represented by the general formula $CH_2=CHR$, where R is an alkyl radical having 1 to 6 carbon atoms. Representative 1-monoolefins coming within the scope of this general formula and useful in this invention include propylene, 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 4-methyl-1-hexene, 4-methyl-1-heptene, 5-methyl-1-heptene, 4,4-dimethyl-1-hexene, 6-methyl-1-heptene, 3,4,4-trimethyl-1-pentene, and the like, including mixtures of 2, 3 or more thereof.

Any of the polymerization coordination catalysts known in the prior art can be employed in the polymerization process of this invention, which catalysts comprise (1) at least one compound of a reducible polyvalent transition metal of Groups IVB, VB, VIB, VIIB, and VIII of the Periodic Table (e.g., titanium, vanadium, chromium, manganese, iron, cobalt and nickel), said reducible compound being a halide, oxyhalide, acetylacetonate, or acetate, and (2) at least one reducing compound of the metal of Groups I, II, IIIB, IVA and VA of the Periodic Table (e.g., lithium, sodium, potassium, rubidium, cesium, beryllium, magnesium, calcium, strontium, barium, copper, zinc, cadmium, mercury, aluminum, tin and antimony), which is preferably above hydrogen in the electromotive series, said reducing compound being an organometal compound, a metal hydride, an organometal hydride or an organometal halogen compound. (The Periodic Table referred to herein and in the claims is shown on pages 448–449 of the Handbook of Chemistry and Physics, 43rd edition, published by Chemical Rubber Publishing Company, Cleveland, Ohio.) Preferably, the metal of the reducible compound is vanadium, titanium, or chromium, with vanadium trichloride, vanadium tetrachloride, vanadium oxytrichloride, vanadium oxydichloride, vanadium acetylacetate, vanadium acetylacetonate, vanadyl acetylacetonate, titanium tetrachloride, tetrabutyl titanate, tetraisopropyl titanate, chromic chloride, chromium acetylacetonate, and chromyl acetylacetonate being examples of preferred reducible components of the coordination catalyst. Preferably, the reducing compound has a general formula $R_nMX_m$ where R is a saturated aliphatic, saturated cycloaliphatic, or aromatic hydrocarbon radical having from 1 to 20 carbon atoms, M is a metal selected from the group consisting of lithium, sodium, potassium, magnesium, calcium, zinc, mercury, aluminum and tin, X is a halogen selected from the group consisting of chlorine, bromine and iodine, $n$ is a number of from 1 to 4, $m$ is a number from 0 to 2, and $n+m$ is equal to the valence of metal M. The mol ratio of the reducing compound to the reducible compound in the catalyst system can vary widely, and generally this ratio will be in the range of 1/1 to 20/1. The concentration of reducible compounds in the catalyst system can be in the range from 0.05 to 20 millimoles (mmoles) per 100 grams of the total monoolefin charged to the reaction system.

Representative reducible transition metal compounds which can be used in making up the coordination catalysts used in preparing the polymers of this invention include: titanium tetrachloride, titanium tetrabromide, titanium oxydichloride, tetraisopropyl titanate, titanium trichloride, tetra-n-butyl titanate, tetra-2-ethylbutyl titanate, vanadium trichloride, vanadium tetrachloride, vanadium oxytrichloride, vanadium acetylacetonate, vanadyl acetylacetonate, tetra-n-butyl vanadate, tetraethyl vanadate, trimethyl orthovanadate, vanadium oxydichloride, vanadium dichloride, 2-ethylhexyl vanadate, vanadium dibromide, vanadium pentoxide, chromyl chloride, chromium acetylacetonate, chromyl acetylacetonate, chromium chloride, cobaltous chloride, manganese bromide, cuprous chloride, ferric bromide, molybdenum chloride, nickel chloride, and the like, including mixtures thereof.

Representative reducing compounds which can be commingled with any one of the above-named transition metal compounds to prepare the coordination catalysts used in this invention include: ethylaluminum sesquichloride, ethylaluminum sesquiiodide, n-butylaluminum sesquibromide, isopropylaluminum sesquichloride, n-hexylaluminum sesquichloride, n-decylaluminum sesquiiodide, trihexylaluminum, triethylaluminum, diethylaluminum chloride, ethylaluminum dichloride, diisobutylaluminum butoxide, triisobutylaluminum, aluminum hydride, isobutylaluminum dichloride, isobutylaluminum dibutoxide, n-butylaluminum dichloride, n-butyllithium, sodium naphthalene, diisobutylzinc, lithium aluminum tetra-n-decyl, lithium aluminum tetra-n-octyl, amylpotassium, tetraphenyltin, diethyltin diiodide, n-butylmagnesium bromide, diphenyl calcium, di-tert-butylzinc, diethylmercury, and the like, including mixtures thereof.

Representative of the coordination catalysts which can be used in this invention are those obtained upon commingling vanadium tetrachloride and ethylaluminum sesquichloride,
vanadium trichloride and ethylaluminum sesquibromide,
vanadium oxytrichloride and n-butylaluminum sesquibromide,
vanadium oxydichloride and isopropylaluminum sesquichloride,
vanadium acetylacetonate and n-hexylaluminum sesquichloride,
vanadium oxydichloride and diisobutylaluminum butoxide,
vanadium oxytrichloride and triisobutylaluminum,
vanadium oxytrichloride and aluminum hydride,
vanadium dichloride and triisobutylaluminum,
vanadium trichloride and isobutylaluminum dichloride,
vanadium tetrachloride and isobutylaluminum dibutoxide,
vanadium tetrachloride and triisobutylaluminum,
vanadium tetrachloride and aluminum hydride,
2-ethylhexyl vanadate and triisobutylaluminum,
titanyl dichloride and isobutylaluminum dichloride,
titanium tetrachloride and isobutylaluminum dichloride,
titanium tetrachloride and lithium aluminum didodecyldichloride,
titanium tetrachloride and n-decylaluminum sesquiiodide,
titanium tetrachloride and sodium naphthalene,
tetraisopropyl titanate and triisobutylaluminum,
tetraisopropyl titanate and sodium naphthalene,
cobaltous chloride and triisobutylaluminum,
cobalt bromide or chloride and triisobutylaluminum,
manganese bromide and triisobutylaluminum,
manganese bromide and diisobutylzinc,
chromium chloride and triisobutylaluminum,
chromium acetylacetonate and n-heptylaluminum sesquichloride,
cuprous chloride and triisobutylaluminum,
ferric bromide and triisobutylaluminum,
molybdenum chloride and triisobutylaluminum,
nickel chloride and triisobutylaluminum,
vanadium oxytrichloride and diethylaluminum chloride,
vanadium tetrachloride and ethylaluminum dichloride,
vanadium oxydiacetylacetonate and triethylaluminum,
trimethyl orthovanadate and trihexylaluminum,
vanadium tetrachloride and trihexylaluminum,
vanadium oxytrichloride and butyllithium,
vanadium triacetylacetonate and diethylaluminum chloride,
titanium tetrachloride and trihexylaluminum,
vanadium trichloride and trihexylaluminum,
titanium trichloride and trihexylaluminum,
titanium dichloride and trihexylaluminum,
vanadium trichloride and n-butyllithium,
vanadium tetrachloride and amylpotassium,
vanadium oxytrichloride and sodium naphthalene,
vanadium oxydichloride and diethylmagnesium,
vanadium acetylacetonate and butylmagnesium bromide,
vanadyl acetylacetonate and diphenylcalcium, chromic chloride and di-tert-butylzinc,
chromium acetylacetonate and diethylmercury,
chromyl acetylacetonate and tetraphenyltin,
titanium tetrachloride and diethyltin diiodide,
tetra-n-butyl titanate and diethylmagnesium, and the like.

The polymerization reaction of this invention is conducted in the absence of oxygen, carbon dioxide, water and other materials which have a deleterious effect on the catalyst activity. The polymerization reaction is conducted in the liquid phase utilizing a solvent, which will usually be a hydrocarbon or a halogenated hydrocarbon, such as propane, butane, pentane, hexane, benzene, toluene, xylene, tetrachloroethylene, cyclohexane, methylcyclohexane, chlorobenzene, o-dichlorobenzene, dichloromethane, 1,1,2,2-tetrachloroethane, and the like. The product polymer will be soluble or dispersed in the solvent and usually will be present in a concentration of 1 to 15 weight percent. The polymerization conditions can vary widely, but generally the polymerization temperature will be in the range of −80 to 150° C. and the reaction pressure will be that sufficient to maintain the reaction mixture in the liquid phase and can be up to 500 or more atmospheres. The polymerization reaction can be conducted in a batch type operation or can be conducted in a continuous manner.

Following polymerization, the polymer product can be conventionally recovered from the effluent by coagulation with a non-solvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di - tert - butylhydroquinone, triphenylphosphite, heptylated diphenylamine, 2,2'-methylene-bis(4-methyl-6-tert-butylphenol), and 2,2,4-trimethyl-6-phenyl-1,2-dihydroquinoline.

The vulcanization or curing of the novel polymers of this invention can be conducted using conventional sulfur vulcanization procedures. The quantity of sulfur employed will generally be about 0.1 to 5 parts by weight per 100 parts of polymer (phr.) and generally about 0.5 to 3 phr. Vulcanization can be effected, for example, at temperatures of 250 to 400° F. for 5 to 120 minutes. Peroxides, for example 0.1 to 10 phr., can be utilized for vulcanization, representative peroxides being bis(alpha, alpha-dimethylbenzyl)peroxide, diisopropyl peroxide, di-tert-butyl peroxide, dibenzoyl peroxide, alpha,alpha-dimethylbenzyl hydroperoxide, tert-butyl perbenzoate, etc. Vulcanization accelerators, accelerator activators, reinforcing agents, extenders, plasticizers, antioxidants and fillers, like those agents employed in compounding natural and synthetic rubber, can also be employed. Fillers and reinforcing agents such as carbon black, clay, calcium silicate, talc, silica, whiting and titanium dioxide, and plasticizers such as naphthenic and paraffinic oils, can be utilized in compounding of the polymers of this invention. Such polymers will have molecular weights in the range of about 5,000 to 1,000,000 and can be used in fabricating such rubber goods and plastic products as coatings for electrical cables, window seals, garden hose, soles and heels, belts, coated fabrics, tires, films, coatings, containers (bottles), pipes, fibers, etc.

The objects and advantages of this invention are illustrated in the following example, but it should be understood that the various materials employed in the example, the conditions of operation, and other details, should not be construed to unduly limit the invention.

EXAMPLE

Copolymers of ethylene, propylene and 6,6-dimethylfulvene were prepared in a series of runs employing toluene as a reaction diluent and using as a polymerization coordination catalyst ethylaluminum sesquichloride commingled with vanadium tetrachloride. In preparation of the said polymers, toluene was charged to the reactor first after which it was purged with nitrogen and the temperature adjusted to 0° C. Ethylene and propylene were then introduced over a 20-minute period to saturate the toluene, ethylene introduced at the rate of 500 ml. per minute and propylene at the rate of 1500 ml. per minute. Addition of these olefins was continued at the same rate throughout each of the runs. After saturation of the toluene, the 6,6-dimethylfulvene was added followed by ethylaluminum sesquichloride and vanadium tetrachloride. The temperature was maintained at 0° C. and the polymerization time was 60 minutes. Each reaction was terminated with an isopropyl alcohol solution of the antioxidant 2,2'-methylenebis(4-methyl-6 - tert - butylphenol), the quantity used being one part by weight per 100 parts of the product rubbery polymer. The polymer was then coagulated in isopropyl alcohol, separated, and dried. In the following Table I a summary of run conditions is presented:

TABLE I

| Run No. | Toluene, ml. | 6,6-dimethyl-fulvene, millimols | Ethylaluminum sesquichloride, millimols | Vanadium tetrachloride, millimols |
| --- | --- | --- | --- | --- |
| 1 | 1,000 | 25 | 2.5 | 1.0 |
| 2 | 1,000 | 25 | 2.5 | 1.0 |
| 3 | 1,000 | 40 | 5.0 | 2.0 |
| 4 | 1,000 | 40 | 5.0 | 2.0 |

The results obtained in each of the runs is presented below in Table II:

TABLE II

| Run No. | Polymer Weight, gms. | Total Unsaturation, mmols ICl/g, Polymer (1) | Propylene, weight percent (2) | Inherent Viscosity (3) | Toluene Insolubles, weight, percent (4) |
| --- | --- | --- | --- | --- | --- |
| 1 | 16.0 | 0.55 | 64 | 1.44 | 1.0 |
| 2 | 25.0 | 0.57 | 56 | 1.70 | Trace |
| 3 | 33.8 | 0.56 | 65 | 1.30 | 0 |
| 4 | 35.4 | 0.53 | 60 | 1.62 | 0 |

NOTES FOR TABLE II (1) The procedure employed to determine total unsaturation by iodine chloride titration was as follows: a 0.5 gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimols of iodine chloride that reacted with 1 gram sample was then calculated. A blank was run using only solvent and iodine chloride and appropriate correction was made when calculating unsaturation.

(2) An infrared procedure was employed to determine the weight percent of propylene. A carbon tetrachloride solution of the polymer containing 1 gram of polymer per 100 ml. of solvent was used. The solution was placed in a 1500-micron cell and scanned for a peak at the 7.25 micron band using a commercial infrared spectrophotometer. The number of methyl groups (N) is obtained from the formula $$N = \frac{(14,000)(A_{7.25})(1,000)}{(C)(t)(\epsilon)} \quad (I)$$

14,000=molecular weight of 1,000 methylene groups
$A_{7.25}$=absorbence at the 7.25 micron band
$C$=concentration of polymer solution in gram/liter
$t$=cell thickness in centimeters
$\epsilon$=specific extinction coefficient The specific extinction coefficient ($\epsilon$=28.700) was determined using three samples of an ethylene/propylene copolymer of known propylene content as a reference material. The value was obtained by solving the equation $$\epsilon = \frac{(14,000)(A_{7.25})}{(d)(t)(N)} \quad (II)$$

$d$ =density of polymer solution in gm./cc. (assumed to be 0.9)
$t$ =thickness of absorbing layer of polymer in centimeters
$N$=number of methyl branches in control polymer The percent propylene was calculated as follows:

$$\text{percent} = \frac{(N)(100)}{333} \quad (III)$$

In the Formula III, 333 is the number of methyl branches per 1000 methylene groups.

(3) The inherent viscosities referred to in Table II were determined by placing 1/10 gram of polymer in a wire cage made from 80 mesh screen and placing the wire cage in 100 ml. of toluene contained in a wide-mouthed 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

(4) The amount of toluene insolubles refers to that amount of material not dissolved after 0.2 gram sample of the polymer remains in contact with 100 ml. of toluene at room temperature for 24 hours.

Polymers from Runs 1, 2, 3 and 4 were blended to give a product having the following properties:

| | |
|---|---|
| Unsaturation, M mols ICl/g. polymer | 0.55 |
| Propylene, wt. percent | 61 |
| Inherent viscosity | 1.51 |
| Toluene insolubles, wt. percent | Trace |

Based on the foregoing data, the polymer composition was calculated. In calculating the weight percent 6,6-dimethylfulvene (molecular weight=106), the C=C was assumed to be ethylene (molecular weight 28). Assuming that two double bonds in fulvene remain in the product polymer then:

$$(0.55)\frac{106}{(2)(1000)}(100) = \text{wt. percent fulvene}$$

The weight percent ethylene in the product polymer is obtained by difference. Following are the results obtained:

| | |
|---|---|
| Propylene, wt. percent | 61 |
| Ethylene, wt. percent | 36.09 |
| 6,6-dimethylfulvene, wt. percent | 2.91 |

The polymer blend was compounded in two recipes. The stocks were cured and physical properties determined. Data are summarized in the following Tables III and IV:

TABLE III.—COMPOUNDING RECIPES
[Parts by weight]

| | Blend No. 1 | Blend No. 2 |
|---|---|---|
| Polymer | 100 | 100 |
| High abrasion furnace black | 50 | 50 |
| Zinc oxide | 5 | 5 |
| Stearic acid | 1 | 1 |
| Circosol 2XH [1] | 30 | 30 |
| Sulfur | 1.0 | 1.5 |
| Captax [2] | 0.6 | 0.5 |
| Methyl Tuads [3] | 1.2 | |
| Monex [4] | | 1.5 |

[1] A petroleum hydrocarbon softener, containing hydrocarbons of high molecular weight, in the form of a heavy, viscous, transparent, pale green, odorless liquid of low volatility: sp. gr. 0.940; Saybolt Universal viscosity at 100° F., about 2,000 seconds.
[2] 2-mercaptobenzothiazole.
[3] Tetramethylthiuram disulfide.
[4] Tetramethylthiuram monosulfide.

The blends were cured for 45 minutes at 320° F. The results of the curing process are presented below in Table IV:

TABLE IV
[Cured 45 minutes at 320° F.]

| | Blend No. 1 | Blend No. 2 |
|---|---|---|
| 300% modulus, p.s.i. | 630 | 860 |
| Tensile, p.s.i. | 2,500 | 3,110 |
| Elongation, percent | 735 | 710 |
| ΔT, ° F | 73.5 | 59.4 |
| Resilience, percent | 63.1 | 65.3 |
| Shore A hardness | 56.5 | 58.5 |
| Gehman freeze point, ° F | −52 | −54 |

The above data clearly demonstrate that the rubber cured satisfactorily in both recipes to give vulcanizates with good properties.

As will be evident to those skilled in the art, various modifications of this invention can be made, or followed, in the light of the foregoing disclosure, without departing from the spirit or scope thereof.

We claim:
1. A linear amorphous vulcanizable copolymer consisting essentially of at least 20 weight percent ethylene, at least 20 weight percent of one other higher 1-monoolefin of the formula $CH_2=CHR$ where R is an alkyl radical having 1 to 6 carbon atoms, and up to 15 weight percent of a fulvene of the formula

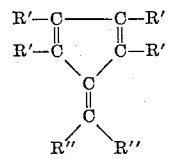

where R' and R" are hydrogen or hydrocarbon radicals selected from the group consisting of alkyl, alkenyl, cycloalkyl, aryl and aralkyl radicals containing from 1 to 8 carbon atoms and two R" groups together can form a bivalent hydrocarbon radical.

2. A linear amorphous vulcanizable copolymer consisting essentially of at least 20 weight percent ethylene, at least 20 weight percent propylene, and up to 15 weight percent of a fulvene of the formula

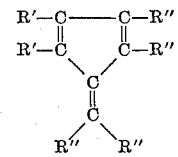

where R' and R" are hydrogen or hydrocarbon radicals selected from the group consisting of alkyl, alkenyl, cycloalkyl, aryl and aralkyl radicals containing from 1 to 8 carbon atoms and two R″ groups together can form a bivalent hydrocarbon radical.

3. A linear amorphous vulcanizable copolymer consisting essentially of at least 30 weight percent ethylene, at least 60 weight percent propylene, and at least 2 weight percent 6,6-dimethylfulvene.

4. A vulcanized copolymer consisting essentially of at least 20 weight percent of ethylene, at least 20 weight percent of a higher 1-monoolefin of the formula $$CH_2=CHR$$

where R is an alkyl radical having from 1–6 carbon atoms, and a fulvene of the general formula

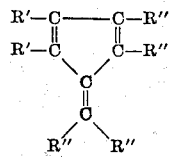

where R′ and R″ are hydrogen or hydrocarbon radicals selected from the group consisting of alkyl, alkenyl, cycloalkyl, aryl, and aralkyl radicals containing from 1–8 carbon atoms and two R″ groups together can form a bivalent hydrocarbon radical.

5. The vulcanized copolymer of claim 4 wherein said higher 1-monoolefin is propylene and wherein said fulvene is 6,6-dimethylfulvene.

6. The vulcanized copolymer of claim 4 consisting essentially of at least 30 weight percent ethylene, at least 60 weight percent propylene, and at least 2 weight percent 6,6-dimethylfulvene.

References Cited by the Examiner

UNITED STATES PATENTS

| | | | |
|---|---|---|---|
| 2,809,372 | 10/1957 | Frederick et al. | 260—85.3 |
| 2,933,480 | 4/1960 | Gresham et al. | 260—80.5 |
| 2,962,488 | 11/1960 | Horne | 260—93.1 |

FOREIGN PATENTS 1,321,029   2/1963   France.

JOSEPH L. SCHOFER, *Primary Examiner.*

W. HOOVER, *Assistant Examiner.*

UNITED STATES PATENT OFFICE
CERTIFICATE OF CORRECTION

Patent No. 3,313,786

April 11, 1967

Gerald R. Kahle et al.

It is hereby certified that error appears in the above numbered patent requiring correction and that the said Letters Patent should read as corrected below.

Column 8, lines 67 to 72 and column 9, lines 14 to 20, the formulas, each occurrence, should appear as shown below instead of as in the patent:

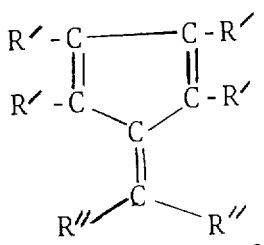

Signed and sealed this 29th day of October 1968.

(SEAL)

Attest:

Edward M. Fletcher, Jr.

Attesting Officer

EDWARD J. BRENNER

Commissioner of Patents